United States Patent [19]
LaViolette et al.

[11] 4,372,016
[45] Feb. 8, 1983

[54] HARDWARE SNAP AND METHOD OF PRODUCING SAME

[75] Inventors: Paul A. LaViolette, North Haven, Conn.; Anthony Caccioli, Longmeadow, Mass.; Alexander Garcia, Berlin, Conn.; Earl H. Hotchkiss, Southington, Conn.; Alfred J. Marchitto, Jr., Glastonbury, Conn.

[73] Assignee: Gulf & Western Manufacturing Company, Southfield, Mich.

[21] Appl. No.: 165,737

[22] Filed: Jul. 3, 1980

[51] Int. Cl.³ .................... B16C 1/36; A44B 13/00
[52] U.S. Cl. ............................ 24/241 PS; 24/241 SL
[58] Field of Search ......... 24/241 PS, 241 SB, 241 S, 24/241 R, 241 PL, 241 PP, 241 SL, 241 SP, 230 AL, 277, 304, 230.5 R; 228/173 C; 248/205 A

[56] References Cited
U.S. PATENT DOCUMENTS

| | | | |
|---|---|---|---|
| 855,368 | 5/1907 | Watson | 24/241 PS |
| 1,233,376 | 7/1917 | Link | 24/241 PS |
| 2,216,499 | 10/1940 | Ohotto | 24/241 SL |
| 3,018,543 | 1/1962 | Beck | 228/173 C |
| 3,409,257 | 11/1968 | Elm | 248/205 A |
| 3,524,215 | 8/1970 | Kurtz | 248/205 A |
| 3,859,693 | 1/1975 | Breed | 24/241 SL |
| 4,063,336 | 12/1977 | Jones et al. | 24/277 |
| 4,122,586 | 10/1978 | Northdurft | 24/277 |
| 4,152,814 | 5/1979 | Ito | 24/241 PS |
| 4,293,156 | 10/1981 | Chapalain | 24/241 PS |

OTHER PUBLICATIONS

North & Judd Catalog No. 264, A Gulf & Western Manufacturing Company.

*Primary Examiner*—Victor N. Sakran
*Attorney, Agent, or Firm*—Body, Vickers & Daniels

[57] ABSTRACT

There is provided an improved hardware fixture of the type known as a snap and including a unitary body with a hook for supporting tension force applied to the snap, a connector for connecting the body to an external force supporting element and an intermediate force transmitting portion between the hook and connector. The improvement comprises forming the body from two, generally flat sheet metal blanks which are secured together in face-to-face relationship with the hook of the snap including two separate, generally flat sheet metal portions of the blanks.

42 Claims, 48 Drawing Figures

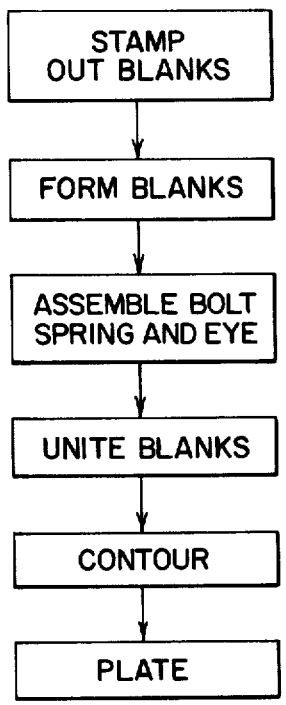
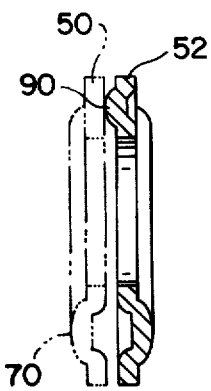
FIG. 8
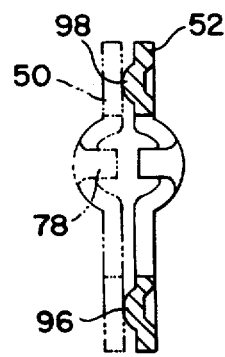
FIG. 10
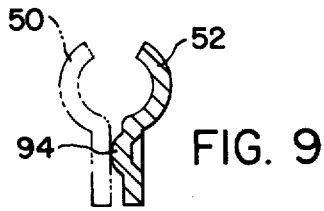
FIG. 9
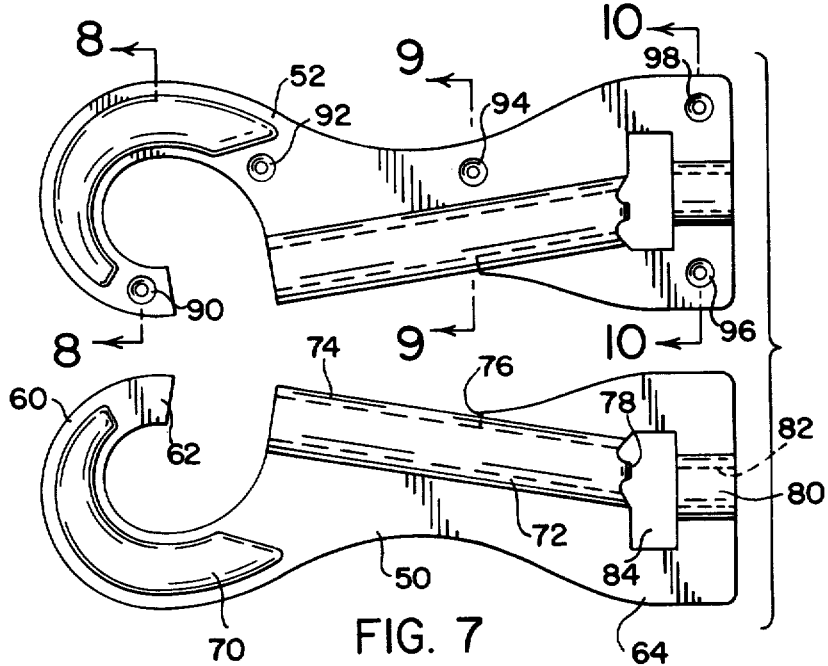
FIG. 7

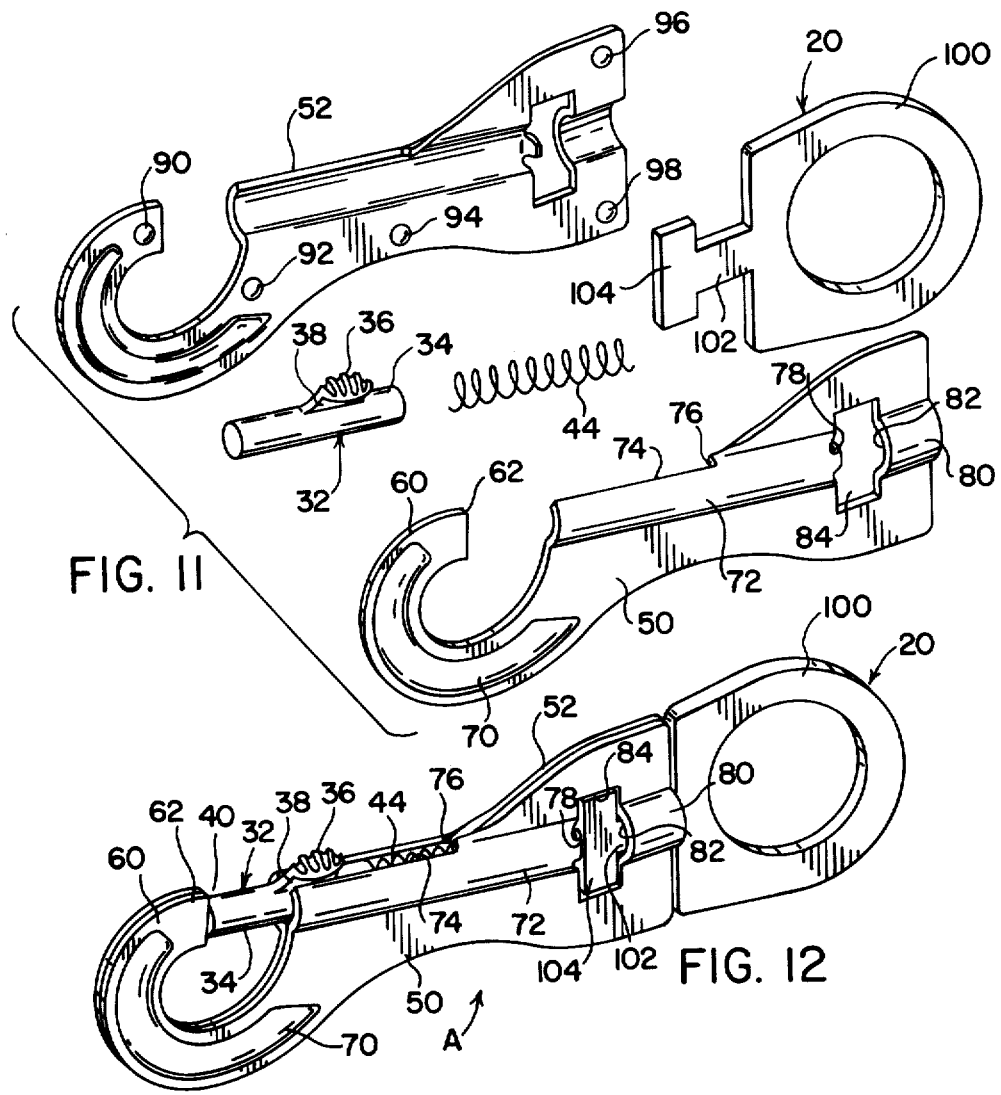
FIG. 11
FIG. 12
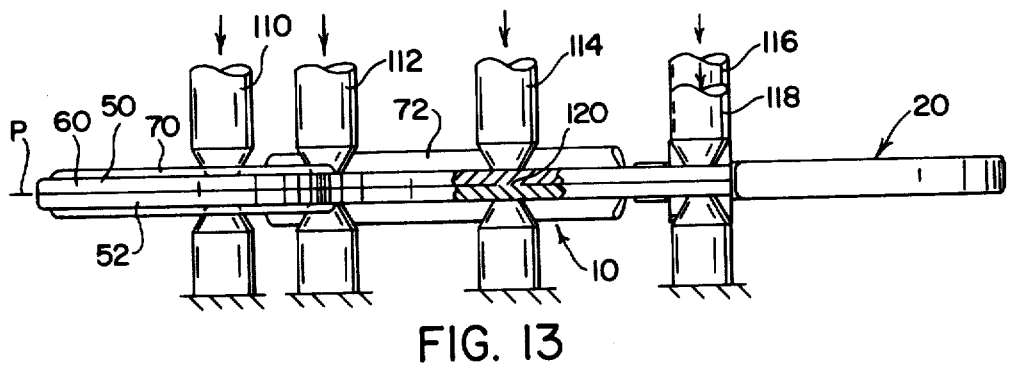
FIG. 13

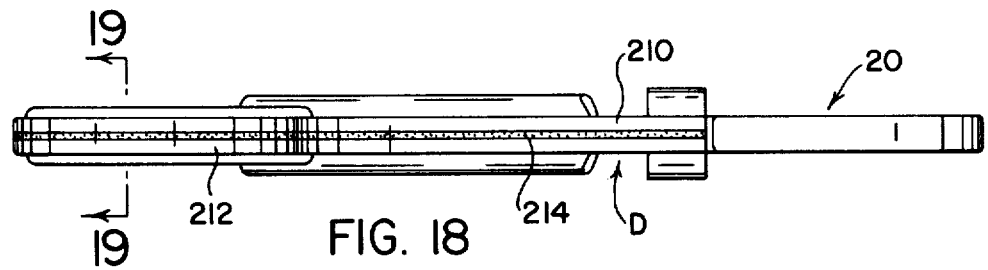
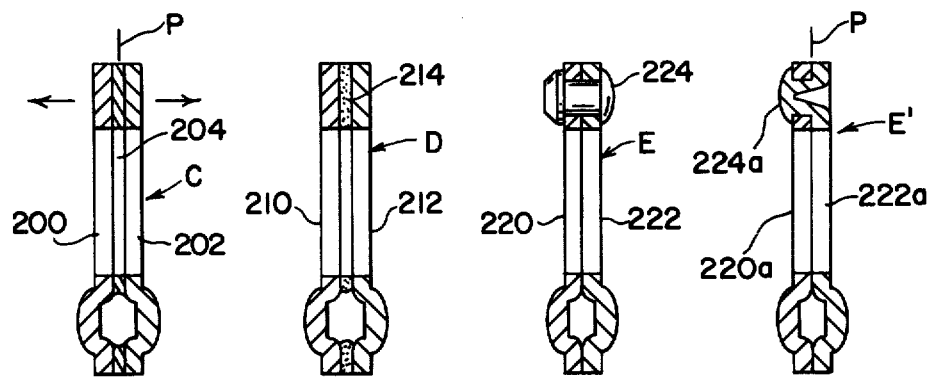
FIG. 17   FIG. 19   FIG. 21   FIG. 22
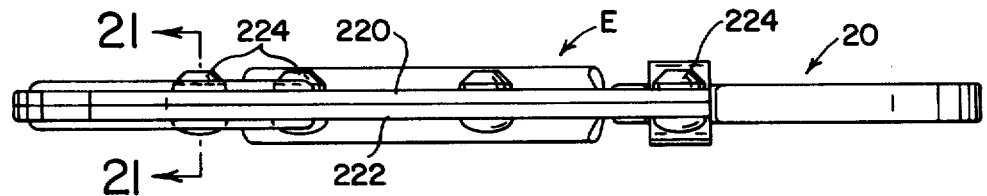

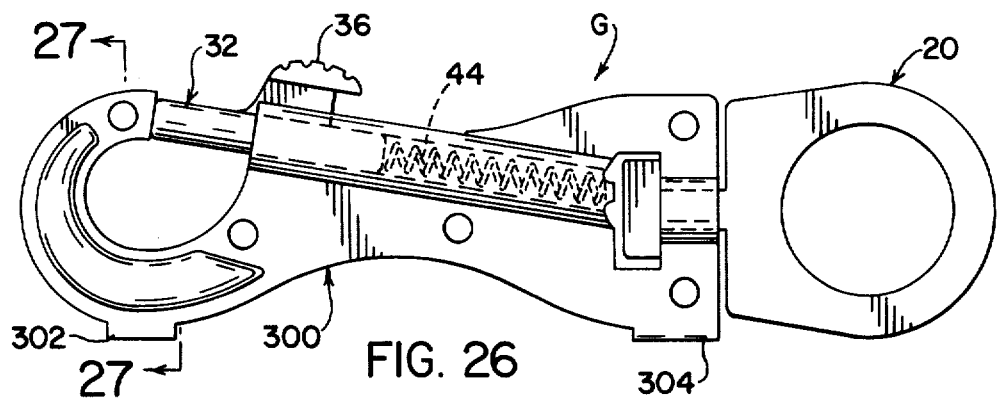
FIG. 26
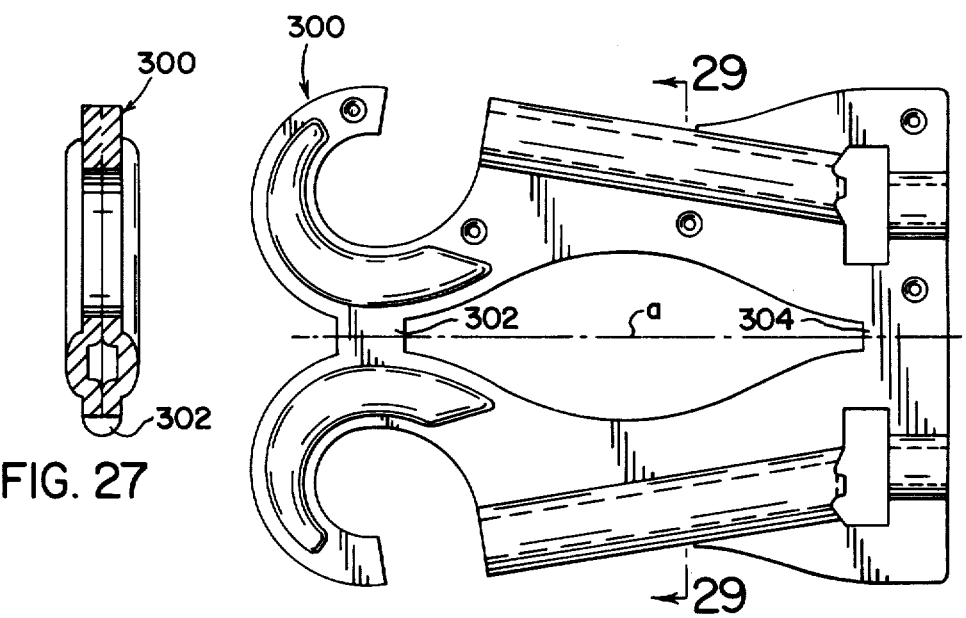
FIG. 27
FIG. 28
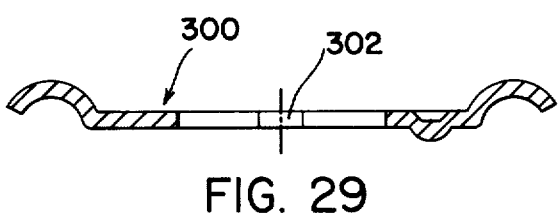
FIG. 29

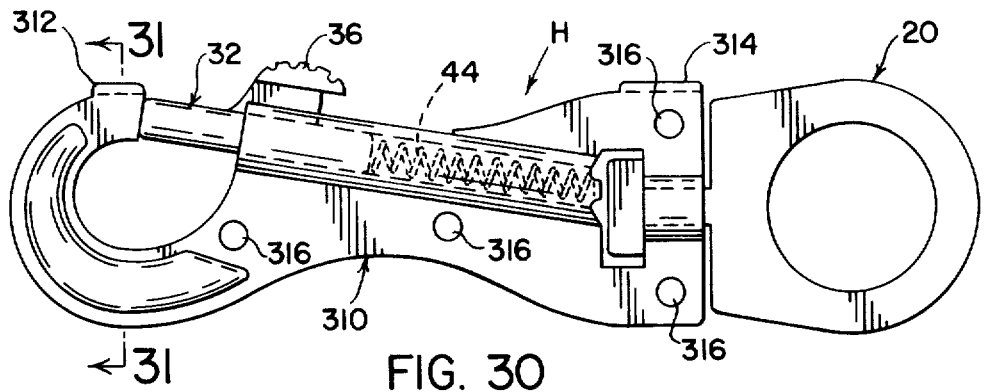
FIG. 30
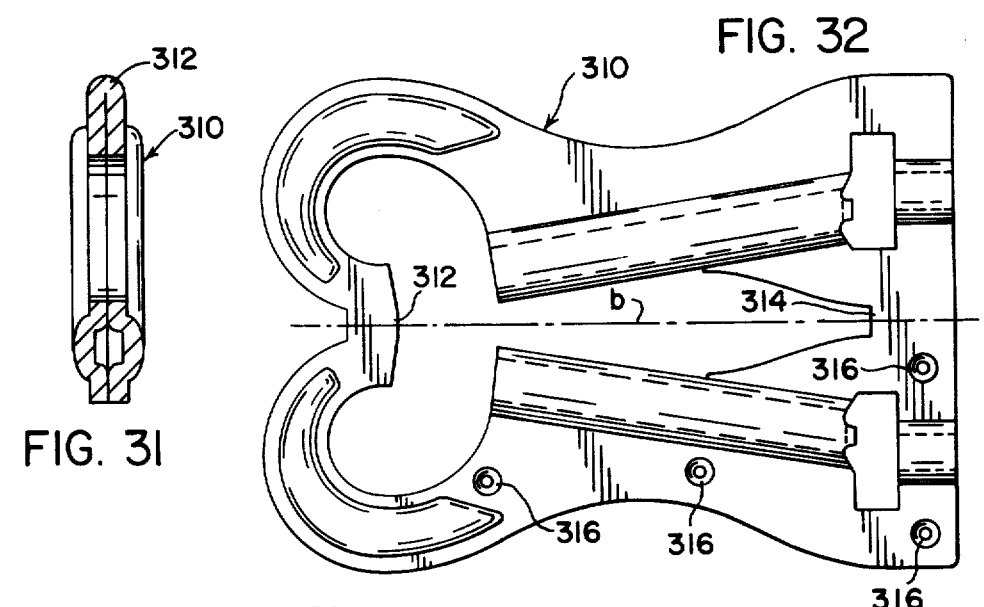
FIG. 31
FIG. 32
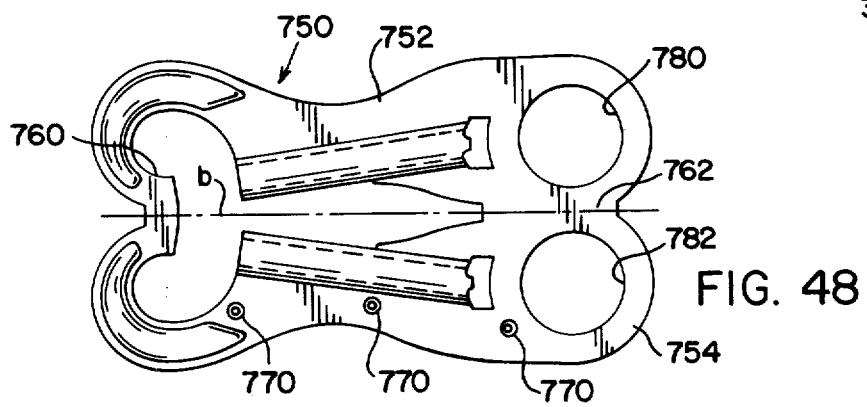
FIG. 48

HARDWARE SNAP AND METHOD OF PRODUCING SAME

The present invention relates to the art of hardware products and more particularly to a hardware snap and method of producing the same.

The present invention is particularly applicable for producing a hardware product known as a bolt snap wherein a force supporting hook is selectively opened and closed by a keeper reciprocally mounted in a bore on the bolt snap and the invention will be described with particular reference to this hardware product; however, as will be apparent from the description, the invention has broader applications and may be used in making various types of hardware snaps incorporating a hook and keeper arrangement for selectively opening and closing access to a load supporting hook.

BACKGROUND OF INVENTION

In making hardware fixtures, such as bolt snaps, the body portion forming the hook and the barrel for the spring biased keeper has heretofore generally been cast from gray iron or malleable iron by a foundry operation. In some instances, such fittings may be cast from brass or bronze. To produce the body portion of the bolt snap in this fashion, a foundry is needed to melt the gray iron, malleable iron, or brass. The molten metal is poured into sand molds having the desired shape of the body to be used for the bolt snap. After this foundry operation, the body is machined and cleaned or burnished. The keeper is then assembled into a machined bore on the body to form the releasable closure for the hook cast as part of the body. A swivel element or eye, when used, is then assembled onto the cast body for supporting the bolt snap on an external structure during use. This manufacturing procedure has been used for many years in making bolt snaps and other similar snaps for hardware products.

When using sand molds and other cast iron foundry procedures, several difficulties are encountered which add to the overall cost of the end product, especially a high production item such as a hardware fixture. Relatively small hardware fixtures add complexity to the foundry operation. In addition, coring and handling of small cast iron components becomes somewhat difficult. Voids and other defects in the foundry operation can cause scrap and rejection of the molded components. When a bolt snap body is formed by a foundry operation, it is difficult to determine the load supporting capacity of the integral hook. It has heretofore been difficult to rate the various bolt snaps and other hardware fixtures having a body with an integral hook. Consequently, the consuming public is not aware of the operating capacity of a hardware snap. If the bolt snap is tested in a machine to determine its point of failure, there is no assurance that this point of failure will be reached uniformly by various other snaps or hardware components employing the same metal and the same foundry procedures. In addition, cast iron has a relatively low shock resistance which can cause fracture of the body portion, especially in the area of the free end hook, by inadvertent blows.

Since a foundry operation requires substantial capital investment, it is difficult to intall plants at dispersed sites. Thus, if manufacturing of bolt snaps is to take place in various geographical locations, a central foundry is used with the component parts being shipped to the various locations for final assembly and/or machining. This adds to the transportation cost which can be prohibitive for relatively low profit items such as hardware fixtures. When using a foundry operation, it is difficult to heat treat the cast body of a bolt snap to provide improved strength characteristics. It is also difficult to provide certain types of finishes which may be decorative and desirable for marketing purposes. Adding further to the cost of the foundry process is the cost of pollution control equipment which is necessary to meet governmental standards. In some instances die casting procedures are employed for the body of hardware snaps. Die casting also is limited with respect to the metals which can be used and the physical properties which can be obtained.

THE INVENTION

The present invention relates to an improvement in the structure and method of producing a hardware snap of the general class including a bolt snap which improvement and method does not require a foundry operation, forging or die casting to produce the unitary hook containing body of the snap. In accordance with the invention, the hardware snap can be produced from a variety of metals, can be rated according to the maximum load carrying capacity, and can be finished by a variety of decorative and utilitarian processes.

In accordance with the present invention there is provided an improvement in a hardware snap of the type including a unitary body with a hook means having a free end for supporting tension force applied to the snap, connector means for connecting the body to an external force supporting element and an intermediate force transmitting portion between the hook means and the connector means. This improvement comprises forming the unitary body by two generally flat sheet metal blanks and securing the blanks in face-to-face relationship with the hook means of the body including two separate, generally flat sheet metal hooks secured together in face-to-face relationship. In this manner, two separate blanks, which are substantially mirror images of each other, can be easily joined together so that the hook portion of each blank combines to form the hook means of the unitary body of the hardware snap. In this manner, the body itself is primarily a laminated sheet metal component where the hook portion is stamped from a sheet metal strip. By combining the hooks of each blank as the blanks are secured together, the resulting hook means is formed from two laminated, non-deformed previously blanked hooks. When the invention is employed for its preferred purpose, i.e. production of a bolt snap, each blank is provided with a deformed elongated groove or recess which combine to form a barrel in the body. This barrel reciprocally receives the hook closing keeper of the bolt snap. Within the barrel formed by the two blanks there is an arrangement to secure a biasing spring that forces the keeper outward toward the terminal, free end of the integral hook means so that the keeper can be manually withdrawn from this free end to allow insertion of the hook means onto an external member or element.

In accordance with another aspect of the invention, there is provided a sheet metal blank which is to be combined in face-to-face relationship with a similar blank to form a unitary body portion of the hardware snap as defined above. This blank, which is essentially half of a final body assembly, includes a curved hook with a free end, a connector portion and an intermediate portion between the hook and the connector portion. In this manner, two blanks constructed in accordance with the present invention can be secured together to form the unitary body of a hardware snap, more specifically a bolt snap.

In accordance with another aspect of the present invention, each of the hooks in the blanks forming a unitary snap body is provided with an arcuate, deformed rib coextensive with the curved hook of the blank and protruding from one side of the blank. The other blank used in the final assembly has a similar rib which extends from the other side of the blank so that when the two blanks are secured together by an appropriate arrangement, these two ribs extend outwardly in opposite directions from the final hook means.

Each of the two hooks formed in the separate sheet metal blanks are flat and extend in a preselected curved direction. They are non-deformed to form hooks. In other words, the hooks are blanked from sheet metal in the curved hook configuration so that two hooks placed together form a larger, final hook for the snap. The resulting hook is not formed by bending sheet metal or by casting the curved configuration from iron or bronze. Thus, the tensile load carrying capacity of the resulting hook means formed by two sheet metal hooks secured together is high and quite uniform. The carrying capacity of the hook means is determined by the dimensions of the individual sheet metal hooks forming the hook means, the metal of these sheet metal hooks and any heat treatment or other treatment of the sheet metal forming the sheet metal hooks.

In accordance with another aspect of the invention, the two sheet metal blanks which are generally flat and secured together may be secured by spot welding, riveting, adhesion, soldering and brazing, to name a few. The reason for the extreme versatility in the securing operation is that the sheet metal blanks carry loads in a direction corresponding to the plane of the blanks. The applied load does not tend to separate the two blanks forming the body. Thus, the securing means or process need not be strong in a mechanical sense to guarantee high strength in the load carrying capacity of the bolt snap. The integral hook means of the unitary body has a load carrying capacity which is substantially twice the load carrying capacity of the individual hooks of the separate sheet metal blanks.

In accordance with another aspect of the present invention, there is provided a method for producing a hardware snap of the type defined above, which method involves producing two flat sheet metal blanks each including a hook, a connector portion and an intermediate portion between the hooks and connector portions and securing these two blanks together in face-to-face relationship with the hooks of the two blanks secured in face-to-face relationship to form the hook means of the resulting hardware snap.

As can be seen, two generally flat blanks stamped from sheet metal are secured together in face-to-face relationship in accordance with the invention. There is no forming of the hook means which involves a metal bending operation. Thus, force applied to the hook does not tend to unbend or reestablish an original position of the metal forming the hook.

Heretofore, no hardware snap, such as a bolt snap, has been produced by using two flat sheet metal blanks secured together. This concept produces several advantages both in operation of the resulting bolt snap and production of the bolt snap. These advantages are accomplished by practicing the invention instead of casting the snap body from iron or bronze, as heretofore done in the hardware fixture art.

By forming the bolt snap body from two generally flat sheet metal blanks, the resulting bolt snap can have a rated load carrying capacity which can be exhibited on the bolt snap itself. This load carrying capacity can be determined by testing. The metal forming the hook means and its characteristics are uniform from one bolt snap to the other. The characteristics of the hardware fixture made in accordance with the present invention may be selectively varied by additional laminated sections, by heat treatment, by changing the thickness or type of sheet metal and by changing the dimensions of the body. Thus, the new bolt snap has a uniform weight carrying strength which can be determined by testing and which can be varied by processing steps well within ordinary engineering skills.

Other advantages are obtained by manufacturing a bolt snap in accordance with the present invention. For instance, the bolt snap can be produced by standard, relatively inexpensive punch presses, instead of foundry equipment. Thus, there is a reduction in capital investment. Different sheet metals can be employed. There is less cost in providing pollution control equipment for the manufacturing operation. In addition, a sheet metal die can be manufactured in one location and shipped to any desired location where a single punch press operation and certain assembly equipment can be used to manufacture, assemble and distribute bolt snaps. Thus, relatively small manufacturing facilities at remote, dispersed locations can be used to produce bolt snaps without large capital investments. Transportation and distribution costs can be reduced in this manner. Thus, by utilizing the present invention, facilities can be located strategically throughout a marketing area for manufacturing the total unit without the complexity inherent in creating a foundry operation at remote locations.

As previously mentioned the sheet metal parts forming the present invention can be selectively heat treated and finished by a variety of coatings, platings or other decorative and utilitarian finishes. There is no need for the complex sand molds and cores. There is a substantial reduction in scrap. In addition, if any scrap is developed it has a substantially lower material, energy and labor input than a scrapped piece which has been cast into the desired shape by foundry methods.

A sheet metal body provides a greater load carrying capacity than a cast metal body for a given weight. Sheet metal has a higher tensile strength than cast gray iron or malleable iron. This is important because a bolt snap is used in tension. By reducing weight, the shipment cost of the bolt snap can also be reduced.

A primary object of the present invention is the provision of an improved body for a hardware fixture or snap employing a hook and a method of making this improved hardware fixture, which improvement and method involves securing together two generally flat sheet metal blanks to form the unitary body.

Another object of the present invention is the provision of an improved hardware fixture and method of making the same as defined above, which improved fixture and method realize all the advantages mentioned above with respect to the use of the present invention.

These and other objects and advantages will become apparent from the following description taken together with the drawings of this disclosure.

BRIEF DESCRIPTION OF DRAWINGS

FIG. 6 is a block diagram illustrating certain procedural steps used in practicing the preferred embodiment of the present invention;

FIG. 7 is a top plan view showing two generally flat, sheet metal blanks constructed in accordance with the present invention and adapted to provide the unitary body of the invention, as illustrated in FIG. 1;

FIG. 8 is an enlarged cross-sectional view taken generally along line 8—8 of FIG. 7 and showing in phantom line a second blank as illustrated in FIG. 7;

FIG. 9 is an enlarged cross-sectional view taken generally along line 9—9 of FIG. 7 with the companion blank shown in phantom line;

FIG. 10 is an enlarged cross-sectional view taken generally along line 10—10 of FIG. 7 with the companion sheet metal blank shown in phantom lines;

FIG. 11 is a disassembled pictorial view of the preferred embodiment as shown in FIG. 1;

FIG. 12 is an assembled pictorial view of the components shown in FIG. 11;

FIG. 13 is a side elevational view showing, somewhat schematically, the spot welding process employed in the preferred embodiment of the present invention;

FIG. 17 is a cross-sectional view taken generally along line 17—17 of FIG. 16;

FIG. 18 is a side elevational view similar to FIG. 16 illustrating still further securing arrangements;

FIG. 19 is a cross-sectional view taken generally along line 19—19 of FIG. 18;

FIG. 20 is a side elevational view illustrating rivets or other mechanical fasteners for securing the two sheet metal blanks together;

FIG. 21 is a cross-sectional view taken generally along line 21—21 of FIG. 20;

FIG. 22 is a view similar to FIG. 21 illustrating a modification of the fastening means;

FIG. 26 is a top plan view illustrating still a further modification of the preferred embodiment of the present invention;

FIG. 27 is a cross-sectional view taken generally along line 27—27 of FIG. 26;

FIG. 28 illustrates the two sheet metal blanks joined together and used in the modification of the present invention as illustrated in FIGS. 26 and 27;

FIG. 29 is a cross-sectional view taken generally along line 29—29 of FIG. 28;

FIG. 30 is a top plan view illustrating another modification of the present invention wherein the two sheet metal blanks are joined together at a different position than shown in FIG. 28;

FIG. 31 is a cross-sectional view taken generally along line 31—31 of FIG. 30;

FIG. 32 is a view similar to FIG. 28 illustrating the sheet metal blanks employed in the embodiment of the invention shown in FIGS. 30 and 31;

FIG. 48 is a modification of the sheet metal blank shown in FIG. 32 to provide a fixed eye on a bolt snap.

PREFERRED EMBODIMENTS OF THE INVENTION

Figure 1:
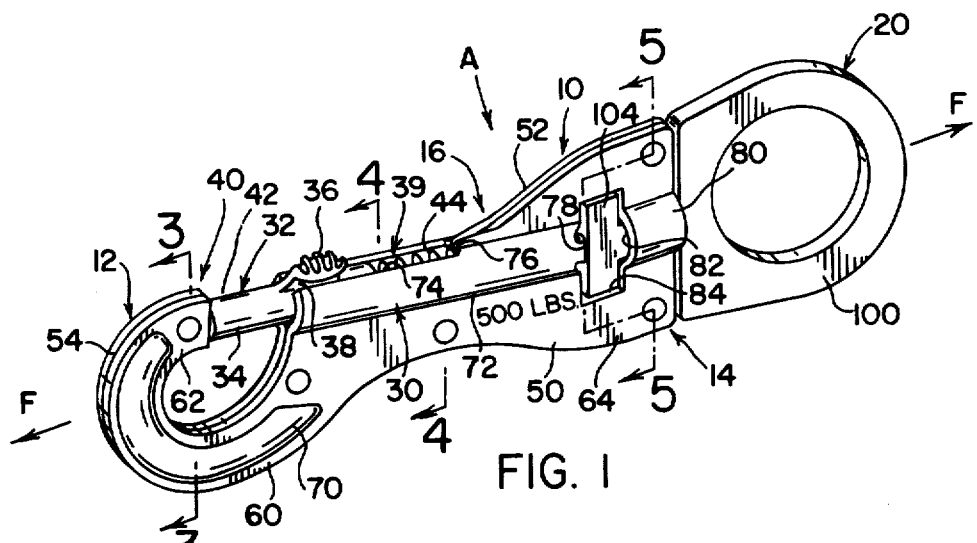
FIG. 1 is a pictorial view of a bolt snap constructed in accordance with the present invention.
Figure 2:
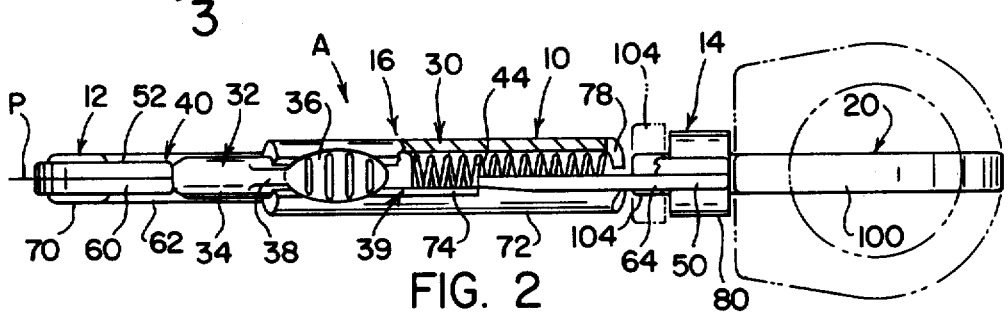
FIG. 2 is a side elevational view of the bolt snap illustrated in FIG. 1.
Figures 3, 4:
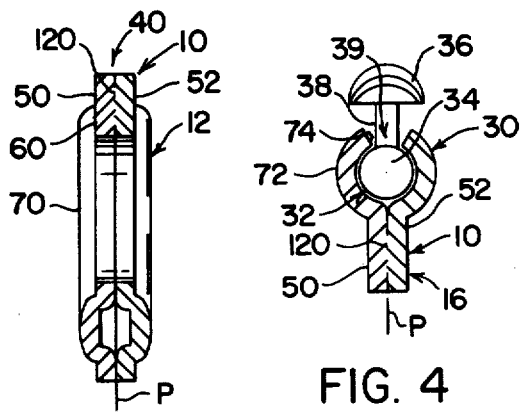
FIG. 3 is an enlarged, cross-sectional area taken generally along line 3—3 of FIG. 1.
FIG. 4 is an enlarged, cross-sectional view taken generally along line 4—4 of FIG. 1.
Figure 5:
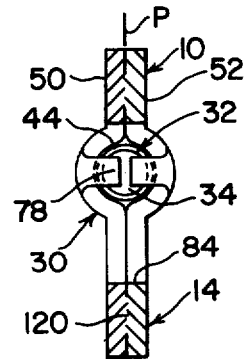
FIG. 5 is an enlarged, cross-sectional view taken generally along line 5—5 of FIG. 1.

Referring now to the drawings wherein the drawings are for the purpose of illustrating preferred embodiments of the invention and not for the purpose of limiting same, FIGS. 1-13 show a bolt snap A constructed in accordance with the present invention. Bolt snap A has general features which are found in bolt snaps of the hardware art. For instance, such bolt snaps include a unitary body 10 which forms the basic element of the bolt snap. This body includes a hook means 12 for connection to an element, such as a rope or eyelet, to support a tension force applied in a direction of arrows F in FIG. 1. The opposite end of body 10 includes a connector means 14 for connection of body 10 onto an appropriate external support element. An intermediate portion 16 of body 10 extends between hook means 12 and connector means 14 to complete the general construction of the body and for asserting forces between the hook means and the connector means. In the bolt snap art, the connector means of body 10 is provided with a swivel connection that is assembled as a part of the bolt snap. In accordance with the preferred embodiment of the invention, element or eye 20 is connected in a swivel fashion onto connector means 14 of body 10 and forms an assembled part of bolt snap A. A bolt snap in the hardware art includes an arrangement for closing the side opening of the hook means. In the preferred embodiment of the invention, a barrel 30 in the form of a generally cylindrical bore is used to receive a somewhat standard tongue or keeper 32 in the form of a cast member having a cylindrical pin 34 and an outboard finger tab 36 joined by a flat, relatively thin rib 38. This rib slides within slot 39 intersecting the bore of barrel 30 to allow movement of keeper 32 manually for opening the side of the hook means 12. As so far described, bolt snap A is a somewhat standard hardware fixture having a hook means formed in a unitary support body. These types of fixtures are relatively small and are manually operated devices for connecting ropes, eyelets and other elements onto a support structure. These fixtures have a body portion which is generally 1.5 to 4.0 inches in length and uniformly less than approximately 5.0 inches in length. Consequently, these hardware fixtures are relatively small devices which are mass produced. A small unit savings in such a high production item can produce substantial total savings.

In accordance with the present invention, the bolt snap A is constructed essentially from stamped and formed sheet metal instead of the previous cast iron or bronze construction for body 10. In accordance with the present invention, body 10 is formed by two generally flat, sheet metal blanks 50, 52 secured in face-to-face relationship. The term "generally flat" indicates that the two blanks 50, 52 can be secured together with a common face-to-face joint 54 which lies in a single plane P. Each of these blanks is substantially the same in profile and in physical characteristics; however, certain formed sections such as the barrel portion, support indentations, and reinforcing grooves or ribs are formed from opposite faces of the blanks so that the finished blanks are in essence substantially mirror images of each other and can be combined as upper and lower or right and left blanks secured together to form unitary bodies 10 as shown in FIGS. 1-13.

Since sheet metal blanks 50, 52 are substantially the same, only blank 50 will be described in detail. This description will apply equally to opposite blank 52. In essence, blank 50 is a sub-body or half body and includes a hook 60 with a terminal or free end 62 and a connector portion 64. The hook and connector portions are on the same blank so that the blank forms an intermediate portion as previously discussed with respect to unitary body 10. Referring now more particularly to FIGS. 1, 7, 11 and 12, hook 60 of blank 50 has a reinforcing rib or groove 70 that is arcuate in shape and extends around the hook. This reinforcing structure appears as a rib on one side of blank 50 and as a groove on the other side of the blank; therefore, it is a rib defined by a groove formed in blank 50 in the arcuate configuration shown in the drawings and matching the shape and contour of hook 60. A barrel defining, elongated housing 72 is semi-circular in configuration and includes a half guide slot 74 that combines with a similar slot on blank 52 to form a clearance slot 39 previously described for keeper 32. A stop 76 is at the end of slot 74 to control movement of the keeper and also to define a cylindrical portion behind stop 76 for housing compression spring 44. Spring 44 urges keeper 32 toward the end of hook means 12 for closing the side opening the hook means, except when access is desired and allowed by movement of the keeper against the action of spring 44. A bent tab 78 acts as a stop for spring 44 in the end of the barrel formed by the housings 72 of both blanks 50, 52 after the blanks are secured together. Connector portion 64 includes a curved bridge portion 80 formed in the metal of the blank as a somewhat semi-circular configuration defining an internal slot 82 intersecting with a pierced aperture 84.

Generally flat blank 52 is substantially the same as blank 50 with the indentation extending in the opposite direction with respect to plane P after the two plates have been placed together preparatory to securing. In the preferred embodiment of the invention, blanks 50, 52 are to be secured together by spot welding; therefore, blank 52 includes a plurality of spot weld nipples 90-98 formed in a known manner and extending toward the direction of plane P after blanks 50, 52 are assembled. As illustrated, one nipple 90 is located at terminal ends 62 of hooks 60 for blanks 50, 52. Nipple 92 is at the opposite curved end of the hooks. In a like manner, nipple 94 is in the intermediate portion of body 10 and nipples 96, 98 are on the opposite sides of the rearward connector portion 64 of blanks 50, 52.

In accordance with the illustrated embodiment of the invention, swivel element or eye 20 is also formed from a sheet metal material and has a width substantially twice the width of blanks 50, 52. This provides an inexpensive strong eye shown as including a flat ring 100, a neck 102 which will rotate within slots 82 after blanks 50, 52 have been assembled and a head 104 which has a transverse dimension greater than slots 82 to prevent withdrawal of element 20 and provides load carrying capacity between the swivel joint and hook means 12 of body 10.

Referring now to FIGS. 6-13, the method of producing body 10 of bolt snap A and assembling the bolt snap in accordance with the present invention is illustrated. As a first step, blanks 50, 52 are stamped from sheet metal in a stamping die. These blanks are then formed to provide rib 70, barrel portion 72, tab 78 and semi-cylindrical connector portion 80. Blank 52 is provided with nipples 90-98. In other words, blanks 50, 52 are substantially the same when stamped from sheet metal. Thereafter, they are formed to have the right and left or upper and lower indentations, as shown in FIGS. 7-10. The blanks 50, 52 are now in the configuration as shown in FIG. 11 and are ready to be assembled with swivel element 20, keeper 32 and spring 44 to provide the finished bolt snap as shown in FIG. 1. FIG. 12 illustrates blanks 50, 52 after they are assembled and ready to be secured together. A variety of arrangements could be used for securing the two blanks together to form the final bolt snap; however, in the preferred embodiment of the invention this securing operation is spot welding. To accomplish this, a plurality of standard spot welding electrodes 110-118 are used to spot weld nipples 90-98, respectively, to provide welded nuggets 120 between the generally flat sheet metal blanks 50, 52. This operation is shown schematically in FIG. 13. Thus, after the blanks have been produced in a normal stamping die and formed, they are assembled with the keeper, spring and swivel element or eyelet 20. They are then secured together or united. Following this operation, the blanks 50, 52 can be contoured or rounded off in accordance with any desired procedure. The snap can be plated or otherwise finished for subsequent marketing. As can be seen, body 10 of bolt snap A is formed from two secured, generally flat sheet metal blanks. This results in advantages discussed in the introductory portion of this disclosure.

Figure 14:
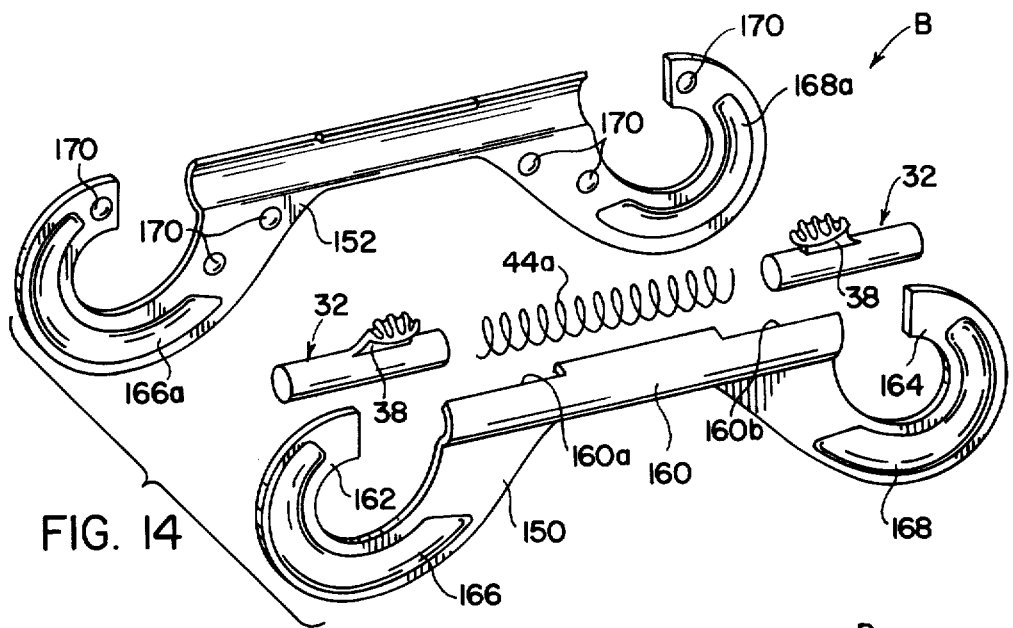
FIG. 14 is a disassembled pictorial view of the invention when employed in a double keeper bolt snap.
Figure 15:
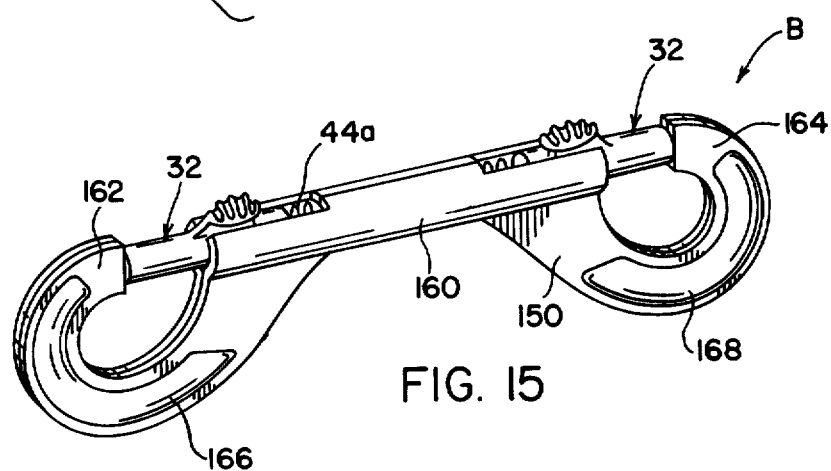
FIG. 15 is an assembled pictorial view of the components as shown in FIG. 14.

Referring now to FIGS. 14 and 15, a further embodiment of the invention is illustrated wherein double ended bolt snap B is constructed in accordance with the invention. In this embodiment, two keepers 32 are biased by a spring 44a captured between two generally flat sheet metal body blanks 150, 152. Since the blanks are substantially the same, only blanks 150 will be described in detail and this description applies equally to blanks 152. After the blank has been pierced from sheet metal, a barrel portion 160 is formed as a substantially semi-cylindrical shell having opposed slots 160a, 160b. At opposite ends of blank 150 there are provided hooks 162, 164 which are flat and pierced from sheet metal without a bending action to form the curled shape. Reinforcing ribs 166, 168 protrude from one side of blank 150. As previously described, these ribs appear on the mating side of blank 152 as grooves 166a, 168a. As is the case in blanks 50, 52, the hooks of blanks 150, 152 are formed by a piercing or cutting action in a flat piece of sheet metal having the desired physical characteristics. To secure blanks 150, 152, spot weld nipples 170 are provided in the mating surface of one of the blanks, illustrated as blank 152 in FIG. 14. The blanks 150, 152 are assembled with the parts illustrated in FIG. 14 to provide a finished, double ended bolt snap B. This bolt snap can be contoured or rounded off and finished in accordance with any decorative plan as was described with respect to bolt snap A.

Figure 16:
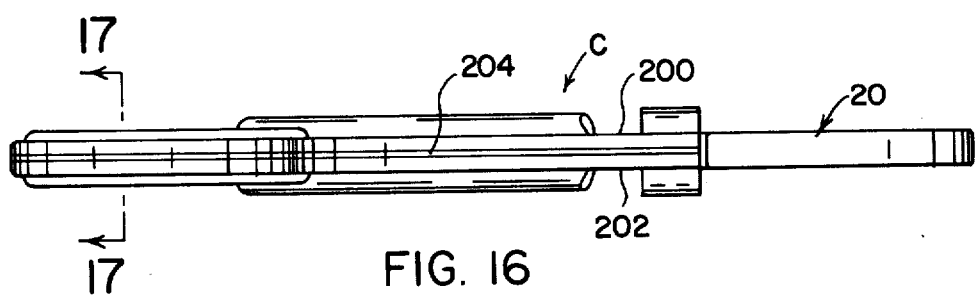
FIG. 16 is a side elevational view, similar to FIG. 13, showing a modification of the means for securing the two generally flat blanks together.

As previously mentioned, the two sheet metal blanks forming the body of the bolt snap A can be secured together by a variety of arrangements. This concept applies to all of the fixtures using the invention, such as bolt snaps A and B. To illustrate this versatility, bolt snap C, as shown in FIGS. 16 and 17, includes generally flat sheet metal blanks 200, 202, substantially the same as blanks 50, 52 and usable with an eye or swivel element 20. These two blanks have generally flat matching surfaces without the spot weld nipples. To secure the blanks together, there is provided a solder layer 204, as best shown in FIG. 17. The arrows of FIG. 17 indicate that there is little force tending to separate the generally flat sheet metal blanks in a transverse or perpendicular direction to the mating plane P at which the two blanks are secured together. Since the joint between the two members does not support substantial weight and forces, soldering is quite appropriate. In a like manner, the two generally flat blanks can be secured together by an adhesive. This is shown in FIGS. 18 and 19 wherein bolt snap D includes sheet metal blanks 210, 212 similar to blanks 200, 202. These blanks are secured together by an adhesive layer 214 formed from an appropriate metal adhesive. In a similar manner, the sheet metal blanks can be riveted or connected together by mechanical fasteners, such as bolts. This concept is shown in FIGS. 20 and 21 wherein sheet metal blanks 220, 222 secured together by a plurality of rivets 224 to form a bolt snap E. Of course, bolts or other mechanical fasteners could be employed for rivets 224. As shown in FIG. 22, a bolt snap E' is similar to the bolt snap E and includes generally flat sheet metal blanks 220a, 222a having riveting protrusions 224a which are formed from blank 222a and extend through apertures in blank 220a. In this manner, a deformation in one of the sheet metal blanks can extend toward the generally flat mating plane P, as long as it does not interfere with the joint between the generally flat blanks forming the body of the bolt snap. Of course, other arrangements could be used for securing the two sheet metal blanks together to form the body of a bolt snap or other hardware snap.

Figure 23:
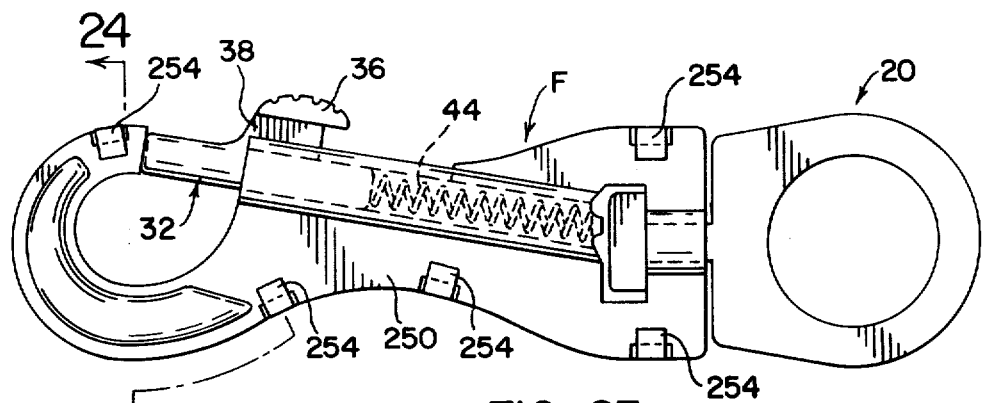
FIG. 23 is a top plan view illustrating still a further modification of the securing arrangement for the present invention.
Figure 24:
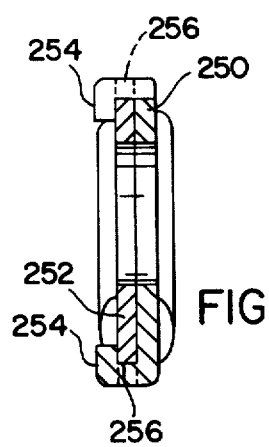
FIG. 24 is a cross-sectional view taken generally along line 24—24 of FIG. 23.
Figure 25:
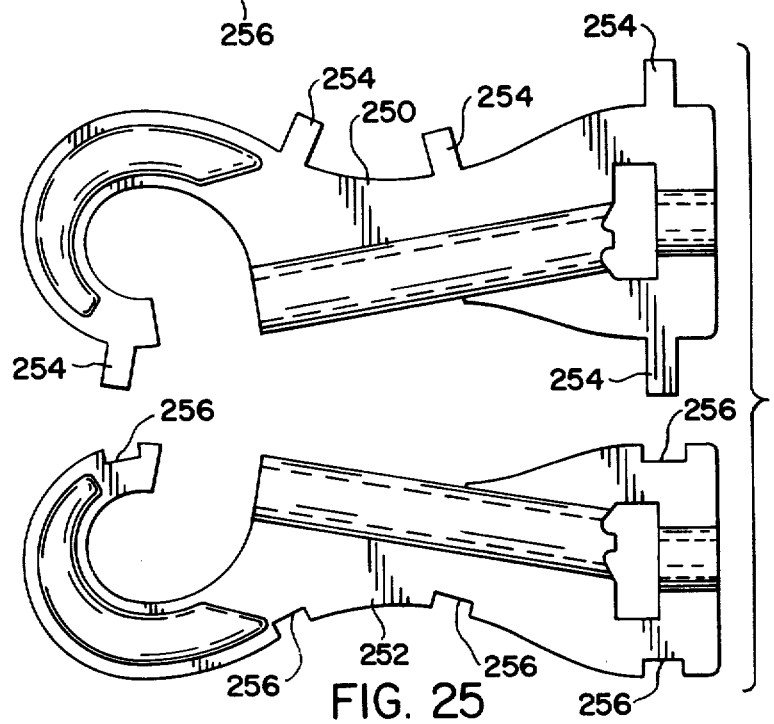
FIG. 25 is a view illustrating the two generally flat, sheet metal blanks used in the embodiment of the invention as illustrated in FIGS. 23 and 24.

Referring now to FIGS. 23-25, a further modification of the securing means employed in accordance with the present invention is illustrated. In this embodiment, a bolt snap F is formed from two sheet metal blanks 250, 252 generally similar to blanks 50, 52. However, blank 250 includes outwardly extending tabs 254 which match companion recesses 256 in sheet metal blanks 252, as shown in FIG. 15. After sheet metal blanks 250, 252 are connected together and assembled with eye 20, keeper 32 and spring 44, tab 254 of blank 250 are deformed or bent around blank 252 at recesses 256. By this interaction of the tabs and recesses, the two sheet metal components are securely fastened. Of course, it is possible to eliminate recesses 256 and fold or crimp tabs 254 over sheet metal blanks 252. This would cause the tabs to protrude from the periphery of the sheet metal blanks, which protrusion is avoided by the use of the recesses. Of course, other metal deformation securing arrangements can be employed. One of such arrangements has been previously described with respect to bolt snap E', as shown in FIG. 22.

Referring now to FIGS. 26-29, a further modification of the preferred embodiment is illustrated. In this modification, blanks 50, 52 as used in forming body 10 of bolt snap A shown in FIG. 1 are formed into a single, unitary blank 300 shown in FIGS. 28 and 29 by providing sheet metal connector ears 302, 304 in the original sheet metal stamping. By folding blank 300 at line a intersecting ears 302, 304, the body for bolt snap G can be formed. By providing the spot weld nipples, as used in bolt snap A, the two body blanks separated by ears 302, 304 can be securely fastened. Of course, the ears also provide a securing mechanism. In some instances, it is possible that no further securing mechanism need be used except for the folding action along line a. Referring now to FIGS. 30-32, a further bolt snap H is illustrated. Bolt snap H employs the concept disclosed in FIGS. 26-29 except that unitary sheet metal blank 310 includes ears 312, 314 at the opposite side of the blanks formed in accordance with the structure of blanks 50, 52 in bolt snap A. By folding blank 310 about ears 312, 314 along line b, the body of the bolt snap H can be formed. Since these ears are adjacent the terminal end of the hooks and barrel portions in the blanks, these ears could be used without spot welding. However, spot welding areas 316 are illustrated as being used with folded unitary blank 310 forming the body of snap H. In both snaps G and H, two separate blanks are employed; however, the blanks are formed from a unitary sheet metal element and are joined together at a folding line.

Figure 33:
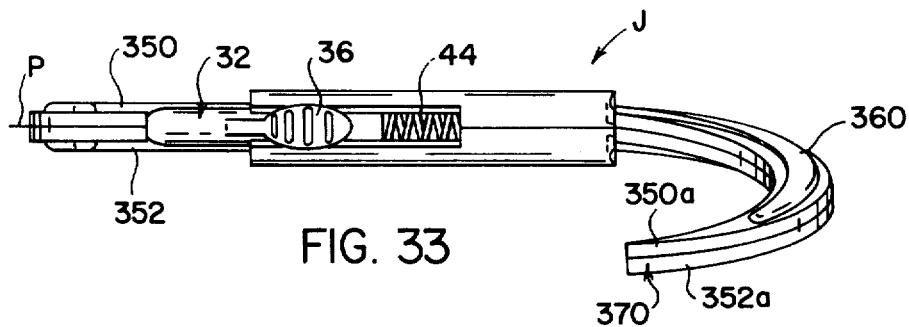
FIG. 33 is a side elevational view showing a bolt snap having a deformed sheet metal connector means.
Figure 34:
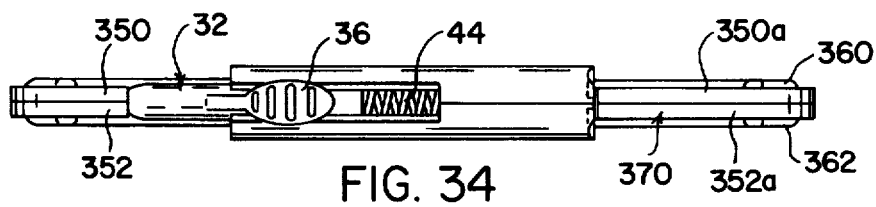
FIG. 34 is a view similar to FIG. 33 illustrating the connector means in the operative position.
Figure 35:
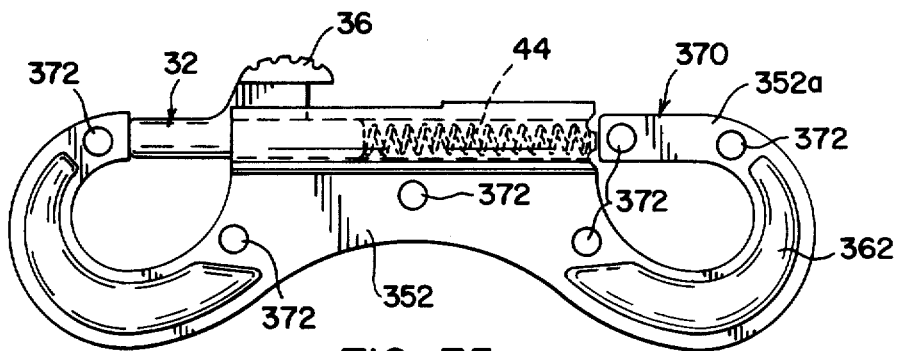
FIG. 35 is a top plan view illustrating the modification of the present invention shown in FIGS. 33 and 34.
Figure 36:
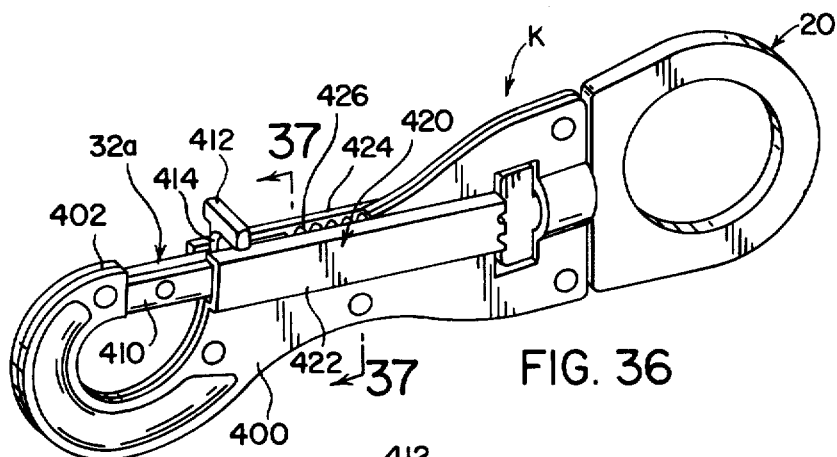
FIG. 36 is a pictorial view showing a further modification of a bolt lock constructed in accordance with the present invention.
Figure 37:
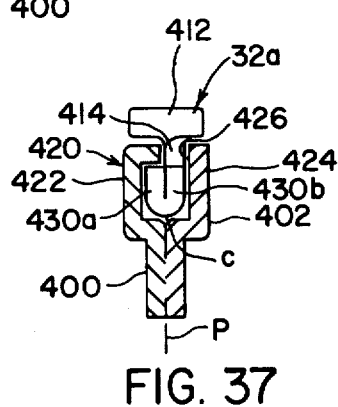
FIG. 37 is an enlarged cross-sectional view taken generally along line 37—37 of FIG. 36.
Figure 38:
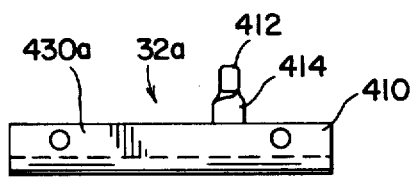
FIG. 38 is a side elevational view of a sheet metal keeper and manual operating tab utilized in the modification of the invention as shown in FIG. 36.

Referring now to FIGS. 33-35, a bolt snap J is provided in accordance with the present invention without a swivel element, as employed in the previously described bolt snaps. In this embodiment, generally flat sheet metal blanks 350, 352 are secured together by any of the arrangements previously described. Instead of having the connector means 14 with a receptacle for the head of eye or element 20, the body of bolt snap J includes a deformable arrangement for securing the bolt snap onto a support structure in a non swivel fashion. In this arrangement, blanks 350, 352 are provided with loop sections 350a, 352a each of which is provided with a reinforcing rib 360, 362, respectively. Loop sections 350a, 352a each have a free end defining a transversely deformable tongue 370. When originally manufactured, tongue 370 is in the position shown in FIG. 34. To assemble the bolt snap onto a support structure, tongue 370 is deformed transversely, i.e. in a direction perpendicular to plane P. This is shown in FIG. 33. Thereafter, loop sections 350a, 352a, which combine to form a loop of bolt snaps J, can be secured over a support structure. By deforming tongue 370 back into the position shown in FIG. 34 with a pair of pliers, the connection operation is completed. In practice, bolt snap J is shipped in the open loop condition shown in FIG. 33. Spot welded positions or junctions 372 join two blanks 350, 352 in accordance with previous discussions of the present invention.

Figure 39:
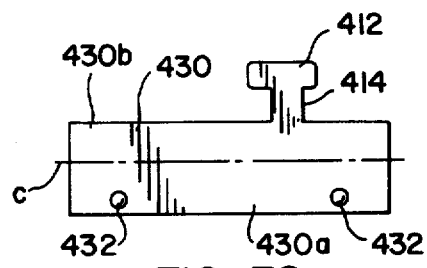
FIG. 39 is a plan view of the sheet metal blank employed in making the element illustrated in FIG. 38.

Referring now to FIGS. 36–39, another aspect of the present invention is described wherein a bolt snap K is formed from sheet metal blanks 400, 402 to accept a modified keeper 32a in the form of a sheet metal member having a body 410, a finger tab 412 and a twisted stem 414 to allow the finger tab to be generally perpendicular to plane P between blanks 400, 402. Although a variety of structures could be utilized for employing a sheet metal keeper 32a, in accordance with the illustrated embodiment, barrel 420 includes a central rectangular bore or passage defined by rectangularly formed barrel halves 422, 424. Barrel half 424 is provided with an upper slot 426 for receiving twisted stem 414. Bolt snap K operates like the other bolt snaps previously disclosed. The difference being substantially the modification of barrel 420 and the use of a sheet metal keeper 32a. To produce the keeper, a variety of arrangements could be used. In the illustrated embodiment, a blank 430, as shown in FIG. 39, is stamped from a piece of sheet metal with spot weld nipples 432. After being stamped from sheet metal, blank 430 is folded along line c to define body sections 430a, 430b. To secure these sections together, spot welding can be done adjacent nipple 432. Of course, the folding operation can provide the keeper without the necessity of such spot welding. It has been found that the use of a sheet metal keeper prevents accidental breakage of finger tab 412 when bolt snap K is dropped or when the finger tab receives a blow. The metal forming blank 430 can be selected to allow twisting at neck 414 and resistance to fracture in this area.

Figure 40:
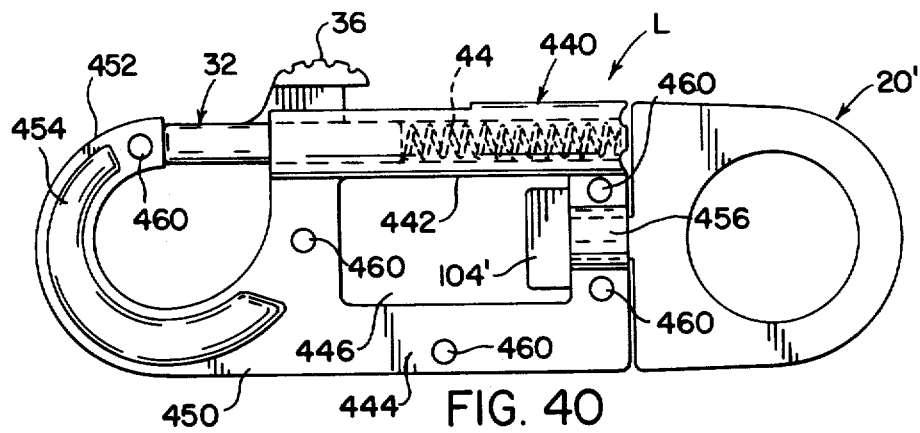
FIG. 40 is a top plan view illustrating still a further modification of the preferred embodiment of the invention.

A further modification of the invention is illustrated in FIG. 40 wherein bolt snap L includes a keeper barrel 440 in a leg 442 which is generally parallel to a support leg 444. The two legs are separated by a pierced opening or aperture 446. This aperture forms the clearance area for head 104' of a somewhat modified swivel element or eye 20'. The modification of this eye is in the profile of the outwardly extending portion. Bolt snap L is formed from two generally flat, sheet metal blanks as previously described. Only one of these blanks, i.e. blank 450, is shown in FIG. 40. The other blank is on the opposite side of bolt snap L and has structural features similar to blank 450. Both of these blanks include a hook 452 with an arcuately extending rib 454 and a connector slot 456 through which swivel element 20' extends. Although snap L is illustrated as being spot welded at location 460, other securing arrangements previously described could be employed.

Figure 41:
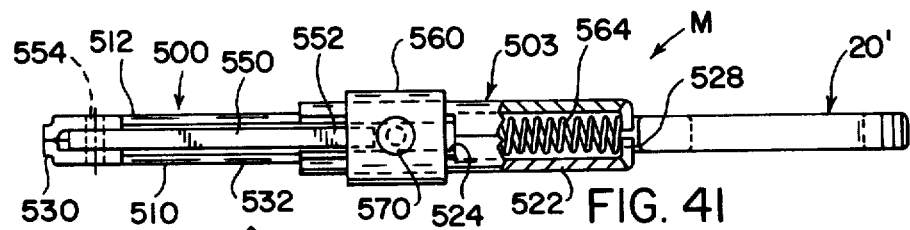
FIG. 41 is a side elevational view of a further modification of the present invention showing a snap lock type of hardware fixture with a manual release and constructed in accordance with the present invention.
Figure 42:
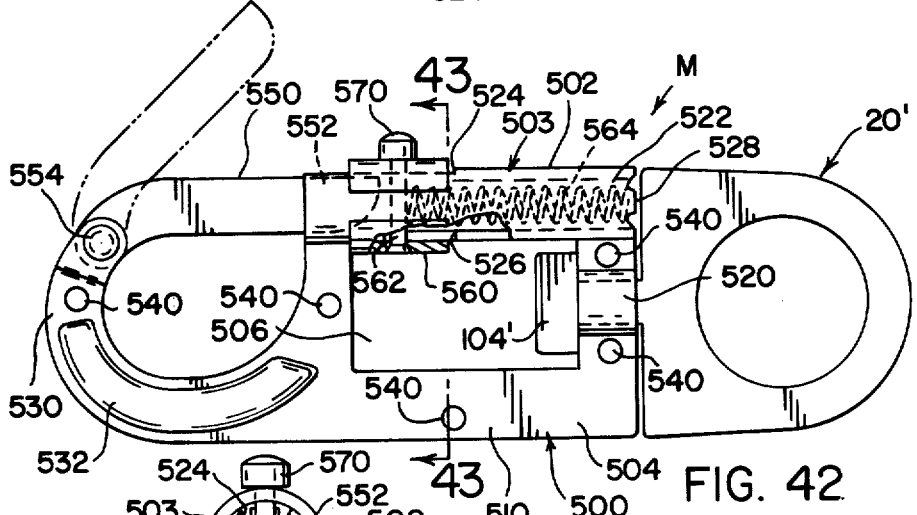
FIG. 42 is a top plan view with a cross-sectioned portion and showing the embodiment of FIG. 41.
Figure 43:
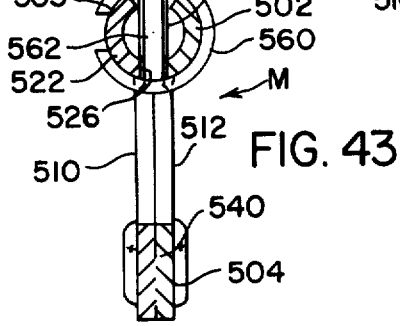
FIG. 43 is a cross-sectional view taken generally along line 43—43 of FIG. 42.

Referring now to FIGS. 41–43, a lock snap M constructed in accordance with the present invention and forming another aspect of the present invention is constructed to operate similar to the bolt snaps previously described. A body 500 includes spaced parallel legs 502, 504 defining a central aperture 506 similar to the structure shown in FIG. 40. Barrel 503 is formed in leg 502 by two generally flat, sheet metal blanks 510, 512 secured together in accordance with the invention previously described. Snap M includes swivel element 20' having a head 104' as discussed with respect to snap L shown in FIG. 40. Since blanks 510, 512 are substantially the same, only blank 510 will be described. This description will apply to blank 512. The blanks include a deformed area 520 which combines to form the swivel connector portion of snap body 500. A half barrel 522 includes an upper slot 524, a lower slot 526 and a rearward spring tab 528. A shortened hook 530 is provided with an arcuately extending reinforcing rib 532 so that hooks 530, when combined, form a hook means for snap M. Spot weld areas 540 are used to secure blanks 510, 512 together to form unitary body 500. A lock finger 550 having a free end 552 is pivotally mounted onto the free end of hook 530 so that the finger may be manually pivoted between the closed position, shown in solid lines in FIG. 42, and the opened position, shown in phantom lines in FIG. 42. To secure finger 550 in its closed position, a split ring or sleeve 560 is slipped over end 552, as shown in FIG. 42. To accomplish this, a split sleeve 560 is reciprocally mounted on barrel 503 and includes a support pin 562 extending through the barrel and through an upper and lower slot formed by slots 524, 526 of the individual sheet metal blanks 510, 512. A spring 564 supported in barrel 503 and abutting tabs 528 biases pin 562 and sleeve 560 toward the closed position. To open snap M, knob 570 supported on pin 562 is forced to the right, as shown in FIG. 42. This allows either opening or closing of finger 550. Finger 550 can cam sleeve 560 to the right during the closing action. In this manner, a relatively simplified lock snap is provided having the characteristics of a bolt snap except for a pivoted locking finger instead of a reciprocal keeper.

Figure 44:
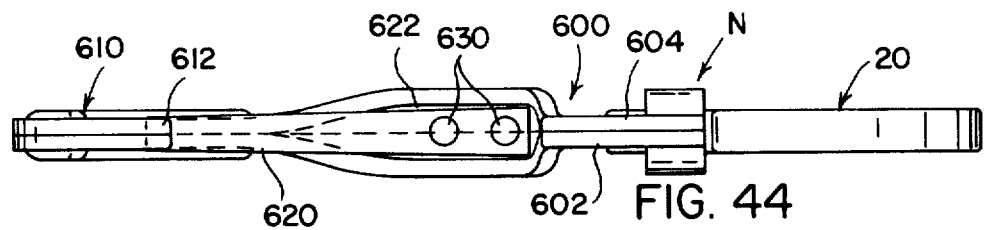
FIG. 44 is a side elevational view showing still further a hardware fixture using the present invention.
Figure 45:
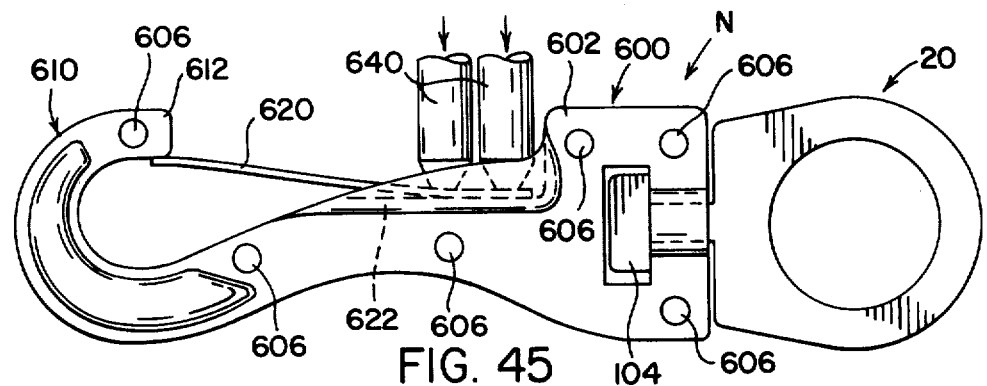
FIG. 45 is a top plan view illustrating a fixture as shown in FIG. 44 with the spot welding electrodes used in its assembly.

Referring now to FIGS. 44 and 45, a hardware spring snap N is constructed in accordance with the present invention. In this hardware fixture using the invention, body 600 is formed from generally flat, sheet metal blanks 602, 604 welded together at various locations 606. The snap includes a hook 610 having a free end 612 which defines an open side area which is normally closed by a leaf spring 620 which is spot welded to a wall 622 of body 600 at one or more areas 630. To illustrate this spot welding concept, two standard spot welding electrodes 640 are illustrated in FIG. 45. Of course, electrodes would be necessary below wall 622 to apply current through spring 620 and the wall for spot welding. As can be seen, the use of two sheet metal blanks secured together can be used for producing a standard spring snap.

Figure 46:
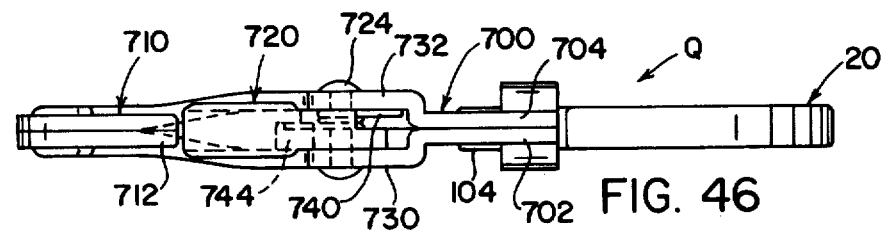
FIG. 46 is a side elevational view showing still a further hardware snap of standard characteristics and employing the present invention.
Figure 47:
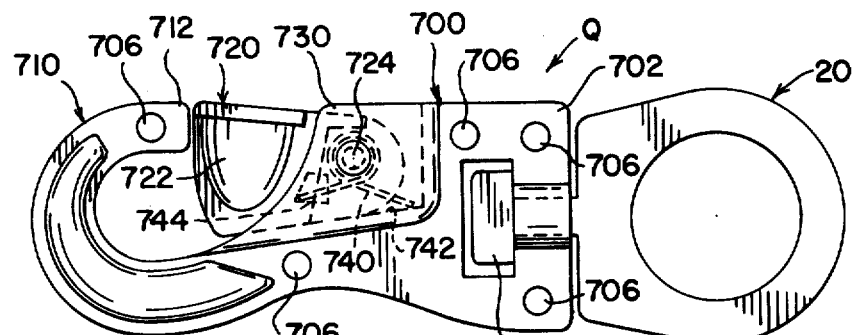
FIG. 47 is a top plan view illustrating the snap as shown in FIG. 46.

A cattle snap is a snap including a hook and can be produced in accordance with the present invention. This is illustrated in FIGS. 46 and 47 wherein cattle snap Q includes a body 700 formed from generally flat, sheet metal blanks 702, 704 spot welded together at areas 706. In this embodiment, body 700 includes a hook 710 having a free end 712 defining an open side for hook 710 that is selectively opened by a pivoted keeper 720 having a finger gripping area 722 on opposite transverse sides. Keeper 720 is pivotally mounted on a pin 724 between spaced plates 730, 732 formed in blanks 702, 704, respectively. A torsion spring 740 has one end engaging stop wall 742 and another end engaging tab 744 supported on keeper 720 and adapted to bias the keeper into the normal position shown in FIG. 47. To open hook 710, keeper 720 is pivoted outwardly against the action of torsion spring 740. After the hook has been placed over a selected element or an element has been placed within the hook, keeper 720 is released and pivots inwardly to the normal position.

In FIG. 48, there is illustrated a blank 750 similar to blank 310 of FIG. 32 and including opposite mirror image plates 752, 754 joined at ears 760, 762. Spot weld nipples 770 are used to secure plates 752, 754 together after they are folded at ears 760, 762 at line b. The connector of the resulting bolt snap is provided by two matching apertures 780, 782 that come together to form an opening through which an external element can be secured.

As can be seen by the various embodiments of the invention, the hook means of the body portion formed by two generally flat sheet metal blanks is formed from two laminated hooks that have been stamped or cut from sheet metal and are not bent to form the configuration of the hook. These laminated hooks are integral with the connector area of the body to provide a holding capacity in a direction parallel to the plane of the sheet metal blanks. By additional laminations and by surface deformation, added strength may be provided. By assembling the body from face-to-face sheet metal blanks, the securing direction is perpendicular to the plane in which force is being applied to the hardware fixture or snap. Thus, there is no substantial tendency to separate the two sheet metal blanks forming the unitary snap body.

Having thus defined the invention, it is claimed:

1. In an assembled hardware device including a unitary body having a hook means with an open side for supporting a tension force applied to said device, connector means for connecting said body to an external force supporting element, and an intermediate force transmitting portion between said hook means and said connector means; a keeper member; and means for assembling said keeper member onto said body for selectively opening and closing said open side of said hook means, the improvement comprising: said unitary body including two generally flat sheet metal blanks having connecting surface portions in the planes thereof, and means for securing said connecting surface portions of said blanks in face-to-face relationship, each of said blanks including a hook, a connector portion and an intermediate portion extending between said hook and connector portion, with said hooks of said secured blanks combining to form said hook means.

2. The improvement as defined in claim 1 wherein said securing means includes a plurality of spot welded junctions between said blanks.

3. The improvement as defined in claim 2 wherein said hooks of said blanks each have terminal ends which ends combine to form a terminal end of said hook means and at least one of said spot welded junctions is at said terminal ends of said hooks.

4. The improvement as defined in claim 3 wherein said blanks each have areas joining said intermediate portions and said hooks and at least one of said spot welded junctions is at said areas of said secured blanks.

5. The improvement as defined in claim 1 wherein said securing means includes a plurality of rivets.

6. The improvement as defined in claim 5 wherein said hooks of said blanks each have terminal ends which ends combine to form a terminal end of said hook means at least one of said rivets is at said terminal ends.

7. The improvement as defined in claim 6 wherein said blanks each have areas between joining said intermediate portions and said hooks and at least one of said rivets is at said areas of said secured blanks.

8. The improvement as defined in claim 1 wherein said securing means includes a face-to-face soldering layer between said blanks.

9. The improvement as defined in claim 1 wherein said securing means is a layer of metal adhesive.

10. The improvement as defined in claim 1 wherein said securing means includes tabs on at least one of said blanks and deformed around the other of said blanks.

11. The improvement as defined in claim 1 wherein said blanks are integral and are attached by at least one selected area and said securing means includes said attached area.

12. The improvement as defined in claim 11 wherein said securing means also includes a plurality of spot welded junctions between said secured blanks and spaced from said attached area.

13. The improvement as defined in claim 11 wherein said hooks of said blanks each have terminal ends which ends combine to form a terminal end for said hook means and said attached area being at said terminal ends of said hooks.

14. The improvement as defined in claim 1 wherein said hooks of said blanks each have terminal ends which ends combine to form a terminal end of said hook means and said securing means includes means for positively securing said terminal ends of said hooks in face-to-face relationship.

15. The improvement as defined in claim 1 wherein at least one of said hooks forming said hook means includes an embossed reinforcing rib extending around said hook and formed outwardly from the blank having said hook in a direction opposite to secured direction of said blank.

16. In an assembled hardware device including a unitary body having a hook means with an open side for supporting a tension force applied to said device, connector means for connecting said body to an external force supporting element, and an intermediate force transmitting portion between said hook means and said connector means; a keeper member; and, means for assembling said keeper member onto said body for selectively opening and closing said open side of said hook means, the improvement comprising: said unitary body including two generally flat sheet metal blanks and means for securing said blanks in face-to-face relationship, each of said blanks including a hook, a connector portion and an intermediate portion extending between said hook and connector portion, with said hooks of said secured blanks combining to form said hook means, said keeper member being a manually operated, elongated bolt and said assembly means being a bolt receiving barrel having a first portion formed in one of said blanks and a matching second portion formed in said other blank, and spring means for forcing said bolt in said barrel toward a position with said bolt contacting said hook means.

17. The improvement as defined in claim 16 wherein said bolt is generally cylindrical, said barrel is generally cylindrical and first and second positions are generally semicylindrical.

18. The improvement as defined in claim 16 wherein said elongated keeper is formed from a sheet metal blank to reciprocate in said barrel and includes an integral finger engageably operating tap extending from said barrel.

19. The improvement as defined in claim 16 wherein said connector means includes matched apertures in said secured blanks and a bore extending through said device and intersecting said apertures, said bore being formed by facing grooves in said secured blanks.

20. The improvement as defined in claim 1 wherein said connector means includes matched apertures in said secured blanks and a bore extending through said device and intersecting said apertures, said bore being formed by facing grooves in said secured blanks.

21. The improvement as defined in claim 16 wherein said connector means is a second manually operated, elongated bolt engageable with a stop on said device and a second barrel means formed in said blanks for receiving said second bolt for movement toward and away from said stop.

22. The improvement as defined in claim 16 wherein said connector means includes a loop formed by said connector portions and having a free end deflectable transversely to said device for receiving and capturing an element in said loop.

23. The improvement as defined in claim 1 wherein said connector means includes a loop formed by said connector portions and having a free end deflectable transversely to said device for receiving and capturing an element in said loop.

24. The improvement as defined in claim 1 wherein said intermediate portions of said blanks include an opening defined by two generally parallel arms, each extending between said hook and said connector portion of a blank.

25. In an assembled hardware device including a unitary body having a hook means with an open side for supporting a tension force applied to said device, connector means for connecting said body to an external force supporting element, and an intermediate force transmitting portion between said hook means and said connector means; a keeper member; and, means for assembling said keeper member onto said body for selectively opening and closing said open side of said hook means, the improvement comprising: said unitary body including two generally flat sheet metal blanks and means for securing said blanks in face-to-face relationship, each of said blanks including a hook, a connector portion and an intermediate portion extending between said hook and connector portion, with said hooks of said secured blanks combining to form said hook means, said intermediate portions of said blanks including two generally parallel arms, each extending between said hook and said connector portion of a blank, said keeper member being a manually operated, elongated bolt and said assembly means being a bolt receiving barrel having a first portion formed in one of said blanks and a matching second portion formed in said other blank, and spring means for forcing said bolt in said barrel toward a position with said bolt contacting said hook means.

26. The improvement as defined in claim 25 wherein said first portion is formed in one of said parallel arms of one of said blanks and said second portion is formed in one of said parallel arms of the other of said secured blanks.

27. The improvement as defined in claim 1 wherein said assembly means includes means for pivotally mounting said keeper member onto said hook means.

28. The improvement as defined in claim 1 including means for locking said keeper in a position closing said open side of said hook means.

29. The improvement as defined in claim 28 wherein said locking means includes a manually operated element on said body biased into a keeper locking position.

30. The improvement as defined in claim 27 wherein said intermediate portions of said blanks include an opening defined by two generally parallel arms, each extending between said hook and said connector portion of a blank.

31. The improvement as defined in claim 30 including means for locking said keeper in a position closing said open side of said hook means.

32. The improvement as defined in claim 31 wherein said locking means includes a manually operated lock plate reciprocally mounted on a structural element formed from one of said parallel arms of each of said secured blanks.

33. The improvement as defined in claim 32 wherein said structural element is a tube parallel to and formed from said arms and a spring in said tube for biasing said lock plate toward said keeper locking position.

34. The improvement as defined in claim 1 wherein said hook means has a terminal end with an inwardly facing portion and said keeper is a spring secured to said unitary body with a free end extending across said open side and biased against said inwardly facing portion of said terminal end of said hook means.

35. The improvement as defined in claim 1 wherein said assembly means includes means for pivotally mounting said keeper member onto said unitary body.

36. The improvement as defined in claim 35 including spring means for biasing said keeper into a position closing said open side of said hook means.

37. In a hardware snap of the type including a unitary body with a hook means with a free end for supporting tension force applied to the snap, connector means for connecting said body to an external force supporting element and an intermediate force transmitting portion between said hook means and said connector means, the improvement comprising: said body being formed by two generally flat sheet metal blanks having connecting surface portions in the planes thereof, said connecting surface portions of said blanks in face-to-face relationship with said hook means including two separate, generally flat sheet metal hooks secured together in face-to-face relationship and means for permanently fastening said blanks together in said face-to-face relationship.

38. The improvement as defined in claim 37 wherein at least one of said generally flat sheet metal hooks includes an arcuate reinforcing groove drawn from said hook and extending around said hook.

39. The improvement as defined in claim 37 wherein said securing means includes a plurality of spot welded junctions between said blanks.

40. The improvement as defined in claim 37 wherein said two blanks are integrally joined and folded into said face-to-face relationship.

41. The improvement as defined in claim 37 wherein said hook means has a free end defining an open side for said hook means and said snap includes a reciprocated keeper mounted between said two blanks and spring means supported between said two blanks for biasing said keeper toward said free end.

42. The improvement as defined in claim 41 wherein said keeper is formed of sheet metal and includes a manually operable tab means for forcing said keeper away from said free end of said hook means.

* * * * *